(12) United States Patent
Pu et al.

(10) Patent No.: US 12,271,197 B2
(45) Date of Patent: Apr. 8, 2025

(54) METHOD AND SYSTEM FOR DECOMPOSING CROSS-DOMAIN PATH PLANNING OF AMPHIBIOUS VEHICLE

(71) Applicants: CHONGQING UNIVERSITY, Chongqing (CN); SHANGHAI UNIVERSITY, Shanghai (CN)

(72) Inventors: Huayan Pu, Chongqing (CN); Lele Ding, Chongqing (CN); Xuyang Zheng, Chongqing (CN); Jun Luo, Chongqing (CN); Jie Ma, Chongqing (CN); Jing Huang, Chongqing (CN); Yongbing Chen, Chongqing (CN); Hongliang Liu, Chongqing (CN); Anming Shen, Chongqing (CN); Haonan Sun, Chongqing (CN)

(73) Assignees: Chongqing University, Chongqing (CN); Shanghai University, Shanghai (CN)

( * ) Notice: Subject to any disclaimer, the term of this patent is extended or adjusted under 35 U.S.C. 154(b) by 275 days.

(21) Appl. No.: 18/096,588

(22) Filed: Jan. 13, 2023

(65) Prior Publication Data

US 2024/0111288 A1  Apr. 4, 2024

(30) Foreign Application Priority Data

Sep. 30, 2022  (CN) .......................... 202211212139.3

(51) Int. Cl.
G05D 1/00  (2024.01)

(52) U.S. Cl.
CPC ........ G05D 1/0212 (2013.01); G05D 1/0206 (2013.01)

(58) Field of Classification Search
CPC ........................... G05D 1/0212; G05D 1/0206
See application file for complete search history.

(56) References Cited

FOREIGN PATENT DOCUMENTS

JP  2012173030  * 2/2011  ............ G01C 21/26

* cited by examiner

*Primary Examiner* — Michael D Lang
(74) *Attorney, Agent, or Firm* — Bochner PLLC; Andrew Bochner; Eric Kleinertz

(57) ABSTRACT

A method and system for decomposing cross-domain path planning of an amphibious vehicle. The method includes: defining a starting point and a target point of cross-domain path planning by acquiring an amphibious map containing coastline information, constructing a candidate set of land-water transition points; setting a multilevel gradient search range on a coastline and a set number of iterations; determining a locally-optimal land-water transition point in each search range in a level-wise search mode; setting a heuristic search termination condition, and determining, based on the heuristic search termination condition, whether a current locally-optimal land-water transition point can be globally optimal; if yes, stopping searching, and determining a globally-optimal land-water transition point; if no, determining whether the range is completely traversed; if yes, stopping searching, and determining a globally-optimal land-water transition point; if no, continuing to traverse the range; finally performing global path planning based on the globally-optimal land-water transition point.

10 Claims, 4 Drawing Sheets

METHOD AND SYSTEM FOR DECOMPOSING CROSS-DOMAIN PATH PLANNING OF AMPHIBIOUS VEHICLE

CROSS REFERENCE TO RELATED APPLICATION

This patent application claims the benefit and priority of Chinese Patent Application No. 202211212139.3, filed on Sep. 30, 2022, the disclosure of which is incorporated by reference herein in its entirety as part of the present application.

TECHNICAL FIELD

The present disclosure relates to the technical field of vehicle path planning, and in particular, to a method and system for decomposing cross-domain path planning of an amphibious vehicle.

BACKGROUND ART

In recent years, unmanned amphibious vehicles integrating the features of mobile robots and unmanned surface vehicles have been widely used in military and civilian fields, such as emergency rescue, beach landing, and material transportation. Like those of other robot systems, the unmanned amphibious vehicles adopt the following five modules as the main technical means: a sensing module, a positioning module, a planning module, a decision-making module, and a control module, and thus for algorithm principles and algorithm designs of some modules, reference may be made to each other. However, in terms of design, a function of implementing navigation independently based on switching of land-water scenarios is added to the unmanned amphibious vehicle, which leads to a certain difference between its planning module and that of mobile robots and unmanned surface vehicles. That is, new scenarios in which a starting point and a target point of the vehicle are in geographical regions with different attributes, such as a landing scenario with a starting point on water and a target point on land and a launching scenario with a starting point on land and a target point on water, are added to a path planning task, which results in a cross-domain path planning task. At present, researchers in the field of path planning mainly focus on land-based mobile robots or unmanned surface vehicles, but there is no good solution to the problem of cross-domain path planning of amphibious vehicles.

In view of this, how to solve the cross-domain path planning problem of amphibious vehicles, ensure timeliness during land-water transition operations of the amphibious vehicles, and cut down economic costs such as vehicle wear and energy consumption caused by relatively poor path quality is a technical problem that needs a prompt solution at present.

SUMMARY

An objective of the present disclosure is to provide a method and system for decomposing cross-domain path planning of an amphibious vehicle, which can effectively solve the cross-domain path planning problem of an amphibious vehicle caused by the mismatch of formats of land and water maps.

To achieve the foregoing objective, the present disclosure provides the following technical solutions:

The present disclosure provides a method for decomposing cross-domain path planning of an amphibious vehicle, including:
  acquiring an amphibious map containing coastline information, determining a starting point and a target point of a cross-domain path planning task of the amphibious vehicle based on the amphibious map, and constructing a candidate set of land-water transition points, where the coastline information includes several pieces of feasible land-water transition region position information;
  setting a multilevel gradient search range on a coastline, and setting a set number of iterations for each search range;
  searching from each search range based on the set number of iterations in a level-wise search mode, determining a locally-optimal land-water transition point in each search range, and adding the locally-optimal land-water transition point into the candidate set of land-water transition points;
  setting a heuristic search termination condition, and determining, based on the heuristic search termination condition, whether there is a possibility that a current locally-optimal land-water transition point is globally optimal;
  if yes, stopping searching, and selecting a globally-optimal land-water transition point from the candidate set of land-water transition points; or
  if no, determining whether the multilevel gradient search range is completely traversed;
  if yes, stopping searching, and selecting a globally-optimal land-water transition point from the candidate set of land-water transition points; or
  if no, continuing to traverse the multilevel gradient search range until the globally-optimal land-water transition point is determined; and
  redetermining the starting point and the target point of the cross-domain path planning task based on the globally-optimal land-water transition point, and performing global path planning.

Optionally, the starting point and the target point are located in different geographical regions; and the geographical regions include land and water areas.

Optionally, the setting a multilevel gradient search range on a coastline, and setting a set number of iterations for each search range specifically includes:
  selecting an intersection of a line connecting the starting point to the target point and the coastline as an intermediate node;
  extending leftward and rightward for a set distance along the coastline with the intermediate node as a center, determining a left first-level node and a right first-level node, and taking a range formed by the left first-level node and the right first-level node on the coastline as a first-level search range;
  continuing to extend leftward from the left first-level node and extend rightward from the right first-level node to obtain a left second-level node and a right second-level node, and taking a range formed by the left first-level node and the left second-level node on the coastline and a range formed by the right first-level node and the right second-level node on the coastline as a two-level search range;
  continuing to determine the search range until the entire coastline between the starting point and the target point is traversed, to complete setting of the multilevel gradient search range, where when the search range is determined, if a coastline end point is reached in advance during extension in one of the leftward direction and the rightward direction, range length compensation is performed in the opposite direction to ensure that a length of each level of search range is kept the same; when the next level of search range is determined, unidirectional extension is performed in a direction opposite to the original extension direction, and an extended distance is twice an extended distance in the original extension direction when the previous level of search range is determined; and allocating, after the multilevel gradient search range is obtained, the number of range iterations based on a size of a feasible land-water transition region included in each range.

Optionally, the determining a locally-optimal land-water transition point in each search range specifically includes:

randomly sampling in a feasible land-water transition region included in a current search range, and determining a total cost value of a current land-water transition point by using formula $f = h_{water} + h_{land} + h_{transition}$ for land-water transition points obtained by sampling, where f is the total cost value of the current land-water transition point, $h_{water}$ is a cost value of reaching a starting point or a target point on water from the current land-water transition point, $h_{land}$ is a cost value of reaching a starting point or a target point on land from the current land-water transition point, and $h_{transition}$ is a cost value of the current land-water transition point; and selecting, within a range of the set number of iterations, a land-water transition point with a minimum total cost value as the locally-optimal land-water transition point in the current search range.

Optionally, the setting a heuristic search termination condition, and determining, based on the heuristic search termination condition, whether there is a possibility that a current locally-optimal land-water transition point is globally optimal specifically includes:

determining a heuristic cost value G of the current search range based on a positional relationship between the starting point, the target point, and the locally-optimal land-water transition point in the current search range, where the heuristic cost value represents a minimum path length from the starting point to the target point through the optimal land-water transition point without considering any obstacles;

determining whether the total cost value of the locally-optimal land-water transition point in the current search range and the heuristic cost value of the current search range meet a condition $f < a \cdot G$, where a is an optimality proportional coefficient, and G is the heuristic cost value; and determining, if the condition is met, that there is no locally-optimal land-water transition point in the subsequent search range that has a total cost value less than that of the current locally-optimal land-water transition point, and terminating the searching.

Optionally, the redetermining the starting point and the target point of the cross-domain path planning task based on the globally-optimal land-water transition point, and performing global path planning specifically includes:

dividing the cross-domain path planning task into a land planning stage and a water planning stage based on the globally-optimal land-water transition point, where starting points of the land planning stage and the water planning stage are the globally-optimal land-water transition point, and target points of the land planning stage and the water planning stage are separately the starting point or the target point of the cross-domain path planning task; and performing path search based on a global path planning algorithm corresponding to the land planning stage and the water planning stage, and merging a found water path and land path into a final path of the cross-domain path planning task to complete the global path planning.

To achieve the foregoing objective, the present disclosure further provides the following solutions:

A system for decomposing cross-domain path planning of an amphibious vehicle includes:

a unit for defining a starting point and a target point and constructing a candidate set of land-water transition points configured to acquire an amphibious map containing coastline information, determine a starting point and a target point of a cross-domain path planning task of an amphibious vehicle based on the amphibious map, and construct a candidate set of land-water transition points, where the coastline information includes several pieces of feasible land-water transition region position information;

a search range determining unit configured to set a multilevel gradient search range on a coastline, and set a set number of iterations for each search range;

a unit for determining a locally-optimal land-water transition point configured to search from each search range based on the set number of iterations in a level-wise search mode, determine a locally-optimal land-water transition point in each search range, and add the locally-optimal land-water transition point into the candidate set of land-water transition points;

a unit for determining a globally-optimal land-water transition point configured to set a heuristic search termination condition, and determine, based on the heuristic search termination condition, whether there is a possibility that a current locally-optimal land-water transition point is globally optimal;

further configured to stop searching when there is a possibility that a current locally-optimal land-water transition point is globally optimal, and select a globally-optimal land-water transition point from the candidate set of land-water transition points;

further configured to determine, when there is no possibility that a current locally-optimal land-water transition point is globally optimal, whether the multilevel gradient search range is completely traversed;

further configured to stop searching when the multilevel gradient search range is completely traversed, and select a globally-optimal land-water transition point from the candidate set of land-water transition points; and further configured to continue to traverse, when the multilevel gradient search range is not completely traversed, the multilevel gradient search range until the globally-optimal land-water transition point is determined; and a global path planning unit configured to redetermine the starting point and the target point of the cross-domain path planning task based on the globally-optimal land-water transition point, and perform global path planning.

Optionally, the search range determining unit specifically includes:

an intermediate node determining module configured to select an intersection of a line connecting the starting point to the target point and the coastline as an intermediate node;

a search range determining module configured to extend leftward and rightward for a set distance along the coastline with the intermediate node as a center, determine a left first-level node and a right first-level node, and take a range formed by the left first-level node and the right first-level node on the coastline as a first-level search range;

further configured to continue to extend leftward from the left first-level node and extend rightward from the right first-level node to obtain a left second-level node and a right second-level node, and take a range formed by the left first-level node and the left second-level node on the coastline and a range formed by the right first-level node and the right second-level node on the coastline as a two-level search range; and further configured to continue to determine the search range until the entire coastline between the starting point and the target point is traversed, to complete setting of the multilevel gradient search range; and a module for allocating a number of iterations configured to allocate, after the multilevel gradient search range is obtained, the number of range iterations based on a size of a feasible land-water transition region included in each range.

Optionally, the unit for determining a locally-optimal land-water transition point specifically includes:

a module for determining a total cost value of a current land-water transition point configured to randomly sample in a feasible land-water transition region included in a current search range, and determine a total cost value of a current land-water transition point by using formula $f = h_{water} + h_{land} + h_{transition}$ for land-water transition points obtained by sampling, where f is the total cost value of the current land-water transition point, $h_{water}$ is a cost value of reaching a starting point or a target point on water from the current land-water transition point, $h_{land}$ is a cost value of reaching a starting point or a target point on land from the current land-water transition point, and $h_{transition}$ is a cost value of the current land-water transition point; and a module for determining a locally-optimal land-water transition point configured to select, within a range of the set number of iterations, a land-water transition point with a minimum total cost value as the locally-optimal land-water transition point in the current search range.

Optionally, the unit for determining a globally-optimal land-water transition point specifically includes:

a unit for calculating a heuristic cost value configured to determine a heuristic cost value of the current search range based on a positional relationship between the starting point, the target point, and the locally-optimal land-water transition point in the current search range, where the heuristic cost value represents a minimum path length from the starting point to the target point through the optimal land-water transition point without considering any obstacles; and a determining unit configured to determine whether the total cost value of the locally-optimal land-water transition point in the current search range and the heuristic cost value of the current search range meet a condition $f < a \cdot G$, where a is an optimality proportional coefficient, and G is the heuristic cost value; and further configured to determine, when the condition $f < a \cdot G$ is met, that there is no locally-optimal land-water transition point in the subsequent search range that has a total cost value less than that of the current locally-optimal land-water transition point, and terminate the searching.

According to the specific embodiments according to the present disclosure, the present disclosure discloses the following technical effects:

The present disclosure provides a method and system for decomposing cross-domain path planning of an amphibious vehicle. The method includes: acquiring an amphibious map containing coastline information and sent by a sensing module, defining a starting point and a target point of a cross-domain path planning task of an amphibious vehicle based on the amphibious map, and constructing a candidate set of land-water transition points, where the coastline information includes several pieces of feasible land-water transition region position information; setting a multilevel gradient search range on a coastline, and setting a set number of iterations for each search range; searching from each search range based on the set number of iterations in a level-wise search mode, determining a locally-optimal land-water transition point in each search range, and adding the locally-optimal land-water transition point into the candidate set of land-water transition points; setting a heuristic search termination condition, and determining, based on the heuristic search termination condition, whether there is a possibility that a current locally-optimal land-water transition point is globally optimal; if yes, stopping searching, and selecting a globally-optimal land-water transition point from the candidate set of land-water transition points; or if no, determining whether the multilevel gradient search range is completely traversed; stopping searching if the multilevel gradient search range is completely traversed, and selecting a globally-optimal land-water transition point from the candidate set of land-water transition points; continuing to traverse, if the multilevel gradient search range is not completely traversed, the multilevel gradient search range until the globally-optimal land-water transition point is determined; finally redefining the starting point and the target point of the cross-domain path planning task based on the globally-optimal land-water transition point, and performing global path planning. The present disclosure can effectively solve the cross-domain path planning problem of an amphibious vehicle caused by the mismatch of formats of land and water maps.

BRIEF DESCRIPTION OF THE DRAWINGS

To describe technical solutions in the embodiments of the present disclosure or in the prior art more clearly, the accompanying drawings required in the embodiments are briefly described below. Obviously, the accompanying drawings described below show only some embodiments of the present disclosure. A person of ordinary skill in the art may further obtain other accompanying drawings based on these accompanying drawings without creative efforts.

REFERENCE NUMERALS

Unit for defining a starting point and a target point and constructing a candidate set of land-water transition points—100, search range determining unit—200; unit for determining a locally-optimal land-water transition point—300; unit for determining a globally-optimal land-water transition point—400, and global path planning unit—500.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for decomposing cross-domain path planning of an amphibious vehicle, which can effectively solve the cross-domain path planning problem of an amphibious vehicle caused by the mismatch of formats of land and water maps.

To make the foregoing objective, features, and advantages of the present disclosure clearer and more comprehensible, the present disclosure will be further described in detail below with reference to the accompanying drawings and specific implementations.

Figure 1:
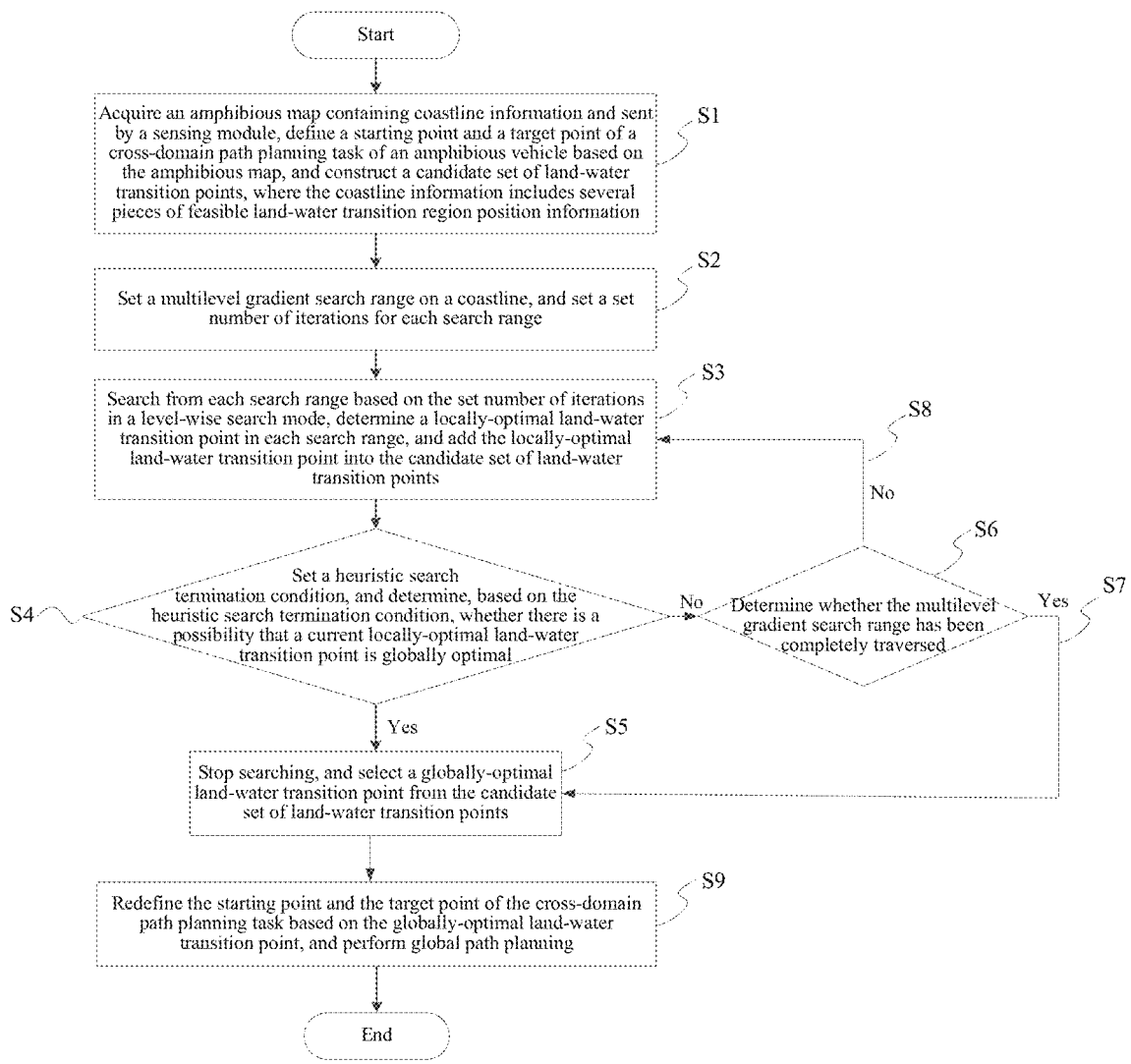
FIG. 1 is a flowchart of a method for decomposing cross-domain path planning of an amphibious vehicle according to the present disclosure.

As shown in FIG. 1, the present disclosure provides a method for decomposing cross-domain path planning of an amphibious vehicle, including the following steps.

S1: Acquire an amphibious map containing coastline information and sent by a sensing module, determine a starting point and a target point of a cross-domain path planning task of an amphibious vehicle based on the amphibious map, and construct a candidate set of land-water transition points, where the coastline information includes several pieces of feasible land-water transition region position information.

S2: Set a multilevel gradient search range on a coastline, and set a set number of iterations for each search range.

S3: Search from each search range based on the set number of iterations in a level-wise search mode, determine a locally-optimal land-water transition point in each search range, and add the locally-optimal land-water transition point into the candidate set of land-water transition points.

S4: Set a heuristic search termination condition, and determine, based on the heuristic search termination condition, whether there is a possibility that a current locally-optimal land-water transition point is globally optimal.

S5: If yes, stop searching, and select a globally-optimal land-water transition point from the candidate set of land-water transition points.

S6: If no, determine whether the multilevel gradient search range is completely traversed.

S7: If yes, stop searching, and select a globally-optimal land-water transition point from the candidate set of land-water transition points.

S8: If no, continue to traverse the multilevel gradient search range until the globally-optimal land-water transition point is determined.

S9: Redetermine the starting point and the target point of the cross-domain path planning task based on the globally-optimal land-water transition point, and perform global path planning. The global path planning is performed based on a relevant global path planning algorithm. Further, in step S1, the starting point and the target point are located in different geographical regions; and the geographical regions include land and water areas. If the starting point is on land, the target point is on water; or if the starting point is on water, the target point is on land.

Further, in step S2, the setting a multilevel gradient search range on a coastline, and setting a set number of iterations for each search range specifically includes:

S21: Select an intersection of a line connecting the starting point to the target point and the coastline as an intermediate node.

S22: Extend leftward and rightward for a set distance along the coastline with the intermediate node as a center, determine a left first-level node and a right first-level node, and take a range formed by the left first-level node and the right first-level node on the coastline as a first-level search range.

S23: Continue to extend leftward from the left first-level node and extend rightward from the right first-level node to obtain a left second-level node and a right second-level node, and take a range formed by the left first-level node and the left second-level node on the coastline and a range formed by the right first-level node and the right second-level node on the coastline as a two-level search range.

S24: In a similar fashion, continuing to determine the search range until the entire coastline between the starting point and the target point is traversed, to complete setting of the multilevel gradient search range, where if a coastline end point is reached in a direction in advance during extension, range length compensation needs to be performed in the opposite direction to ensure that a length of each level of search range is kept the same; during next extension, unidirectional extension is performed in the direction opposite to the original extension direction, and an extended distance is twice that of the previous extension in this direction. This is mainly because when the coastline is traversed to establish a gradient search region, the range is constructed by extending on the coastline from the intermediate node toward two ends for a certain distance, where the position of the intermediate node is related to the positions of the starting point and the target point. If the intermediate node is closer to one of end points of the coastline on the map, the end point of the coastline close to the intermediate node will inevitably be traversed in advance when the search range is constructed. In this case, extension cannot be continued in this direction. However, to ensure that the length of each level of search range is kept consistent, length compensation will be made.

S25: Allocate, after the multilevel gradient search range is obtained, the number of range iterations based on a size of a feasible land-water transition region included in each range. Further, in step S3, the determining a locally-optimal land-water transition point in each search range specifically includes the following steps.

S31: Randomly sample in a feasible land-water transition region included in a current search range, and determine a total cost value of a current land-water transition point by using formula $f=h_{water}+h_{land}+h_{transition}$ for land-water transition points obtained by sampling, where f is the total cost value of the current land-water transition point, $h_{water}$ is a cost value of reaching a starting point or a target point on water from the current land-water transition point, $h_{land}$ is a cost value of reaching a starting point or a target point on land from the current land-water transition point, and $h_{transition}$ is a cost value of the current land-water transition point. $h_{water}$ and $h_{land}$ each generally represent a length of a path, or may indicate passability or safety of the path, such as soil characteristics and topographic relief. In the present disclosure, the most representative path length is selected as the cost value. This can ensure timeliness, and takes energy consumption into account. $h_{transition}$ represents passability of land near the point, such as sudden characteristics and terrain complexity.

S32: Select, within a range of the set number of iterations, a land-water transition point with a minimum total cost value as the locally-optimal land-water transition point in the current search range.

In step S3, the level-wise search mode means searching backward from the first level in the multilevel search range until the number of iterations of the current search range is reached, and then proceeding is performed to the next level of search range for searching.

Further, in step S4, the setting a heuristic search termination condition, and determining, based on the heuristic search termination condition, whether there is a possibility that a current locally-optimal land-water transition point is globally optimal specifically includes the following steps.

S41: Determine a heuristic cost value of the current search range based on a positional relationship between the starting point, the target point, and the locally-optimal land-water transition point in the current search range, where the heuristic cost value represents a minimum path length from the starting point to the target point through the optimal land-water transition point without considering any obstacles.

S42: Determine whether the total cost value of the locally-optimal land-water transition point in the current search range and the heuristic cost value of the current search range meet a condition $f<a \cdot G$, where a is an optimality proportional coefficient, and G is the heuristic cost value.

S43: Determine, if the condition is met, that there is no locally-optimal land-water transition point in the subsequent search range that has a total cost value less than that of the current locally-optimal land-water transition point, and terminate the searching.

Further, in step S9, the redefining the starting point and the target point of the cross-domain path planning task based on the globally-optimal land-water transition point, and performing global path planning specifically includes the following steps.

S91: Divide the cross-domain path planning task into a land planning stage and a water planning stage based on the globally-optimal land-water transition point, where starting points of the land planning stage and the water planning stage are the globally-optimal land-water transition point, and target points of the land planning stage and the water planning stage are separately the starting point or the target point of the cross-domain path planning task.

S92: Perform path search based on a global path planning algorithm corresponding to the land planning stage and the water planning stage, and merge a found water path and land path into a final path of the cross-domain path planning task to complete the global path planning.

Figure 2:
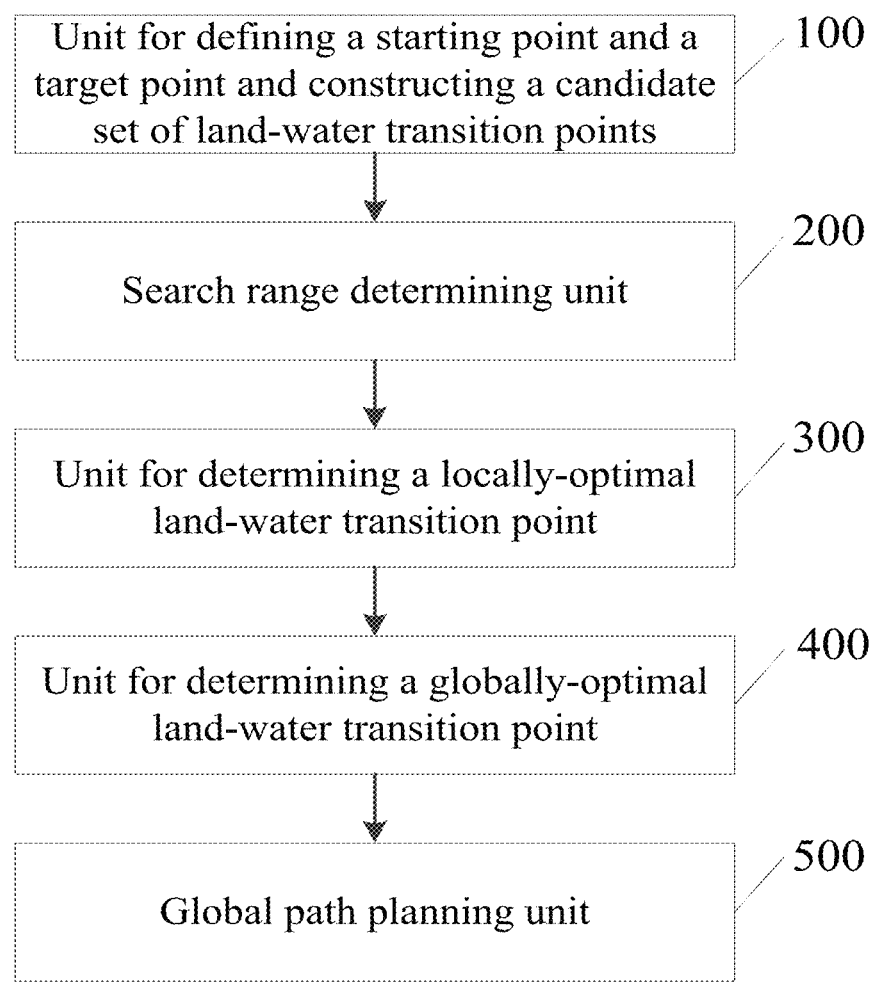
FIG. 2 is a schematic diagram of a module structure of a system for decomposing cross-domain path planning of an amphibious vehicle according to the present disclosure.

To achieve the foregoing objective, the present disclosure further provides the following solutions:

As shown in FIG. 2, the present disclosure further provides a system for decomposing cross-domain path planning of an amphibious vehicle, including a unit 100 for defining a starting point and a target point and constructing a candidate set of land-water transition points, a search range determining unit 200, a unit 300 for determining a locally-optimal land-water transition point, a unit 400 for determining a globally-optimal land-water transition point, and a global path planning unit 500.

The unit 100 for defining a starting point and a target point and constructing a candidate set of land-water transition points is configured to acquire an amphibious map containing coastline information and sent by a sensing module, determine a starting point and a target point of a cross-domain path planning task of an amphibious vehicle based on the amphibious map, and construct a candidate set of land-water transition points, where the coastline information includes several pieces of feasible land-water transition region position information.

The search range determining unit 200 is configured to set a multilevel gradient search range on a coastline, and set a set number of iterations for each search range.

The unit 300 for determining a locally-optimal land-water transition point is configured to search from each search range based on the set number of iterations in a level-wise search mode, determine a locally-optimal land-water transition point in each search range, and add the locally-optimal land-water transition point into the candidate set of land-water transition points.

The unit 400 for determining a globally-optimal land-water transition point is configured to set a heuristic search termination condition, and determine, based on the heuristic search termination condition, whether there is a possibility that a current locally-optimal land-water transition point is globally optimal;

further configured to stop searching when there is a possibility that a current locally-optimal land-water transition point is globally optimal, and select a globally-optimal land-water transition point from the candidate set of land-water transition points;

further configured to determine, when there is no possibility that a current locally-optimal land-water transition point is globally optimal, whether the multilevel gradient search range is completely traversed;

further configured to stop searching when the multilevel gradient search range is completely traversed, and select a globally-optimal land-water transition point from the candidate set of land-water transition points; and further configured to continue to traverse, when the multilevel gradient search range is not completely traversed, the multilevel gradient search range until the globally-optimal land-water transition point is determined.

The global path planning unit 500 is configured to redetermine the starting point and the target point of the cross-domain path planning task based on the globally-optimal land-water transition point, and perform global path planning.

Further, the search range determining unit 200 specifically includes:
  an intermediate node determining module configured to select an intersection of a line connecting the starting point to the target point and the coastline as an intermediate node;
  a search range determining module configured to extend leftward and rightward for a set distance along the coastline with the intermediate node as a center, determine a left first-level node and a right first-level node, and take a range formed by the left first-level node and the right first-level node on the coastline as a first-level search range;

further configured to continue to extend leftward from the left first-level node and extend rightward from the right first-level node to obtain a left second-level node and a right second-level node, and take a range formed by the left first-level node and the left second-level node on the coastline and a range formed by the right first-level node and the right second-level node on the coastline as a two-level search range; and further configured to continue to determine the search range until the entire coastline between the starting point and the target point is traversed, to complete setting of the multilevel gradient search range; and a module for allocating a number of iterations configured to allocate, after the multilevel gradient search range is obtained, the number of range iterations based on a size of a feasible land-water transition region included in each range.

Further, the unit 300 for determining a locally-optimal land-water transition point specifically includes:

a module for determining a total cost value of a current land-water transition point configured to randomly sample in a feasible land-water transition region included in a current search range, and determine a total cost value of a current land-water transition point by using formula $f=h_{water}+h_{land}+h_{transition}$ for land-water transition points obtained by sampling, where f is the total cost value of the current land-water transition point, $h_{water}$ is a cost value of reaching a starting point or a target point on water from the current land-water transition point, $h_{land}$ is a cost value of reaching a starting point or a target point on land from the current land-water transition point, and $h_{transition}$ is a cost value of the current land-water transition point; and a module for determining a locally-optimal land-water transition point configured to select, within a range of the set number of iterations, a land-water transition point with a minimum total cost value as the locally-optimal land-water transition point in the current search range.

Further, the unit 400 for determining a globally-optimal land-water transition point specifically includes:

a unit for calculating a heuristic cost value configured to determine a heuristic cost value of the current search range based on a positional relationship between the starting point, the target point, and the locally-optimal land-water transition point in the current search range, where the heuristic cost value represents a minimum path length from the starting point to the target point through the optimal land-water transition point without considering any obstacles; and a determining unit configured to determine whether the total cost value of the locally-optimal land-water transition point in the current search range and the heuristic cost value of the current search range meet a condition $f<a \cdot G$, where a is an optimality proportional coefficient, and G is the heuristic cost value; and further configured to determine, when the condition $f<a \cdot G$ is met, that there is no locally-optimal land-water transition point in the subsequent search range that has a total cost value less than that of the current locally-optimal land-water transition point, and terminate the searching.

Specific Embodiment

Figure 3:
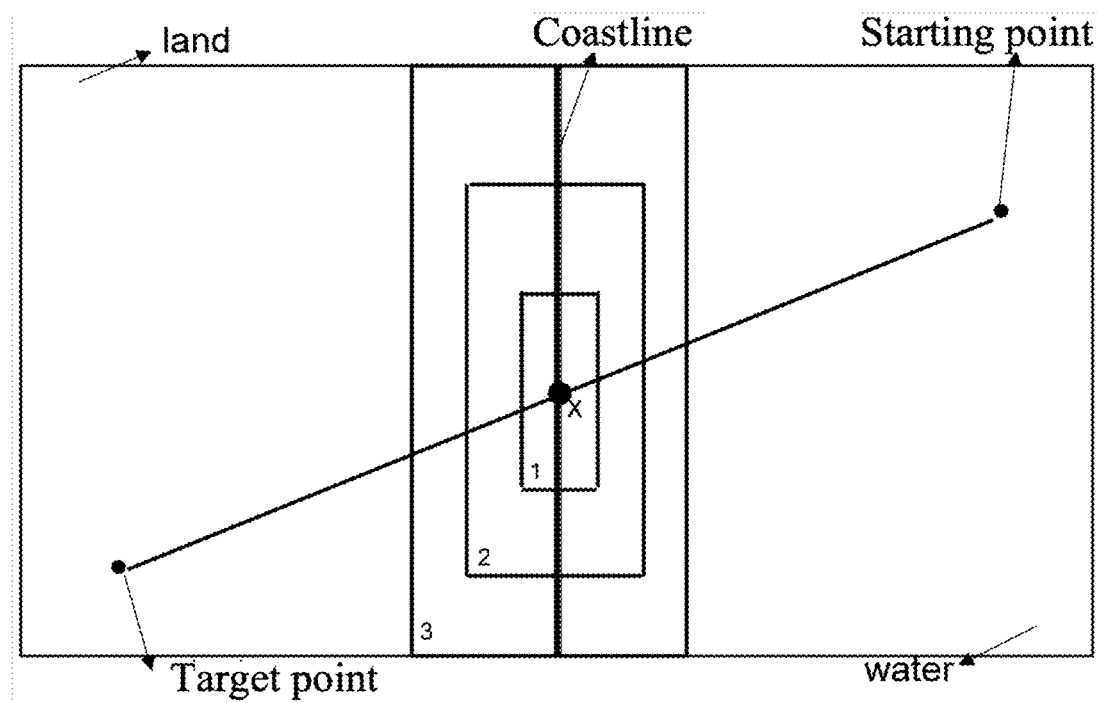
FIG. 3 is a schematic diagram of multilevel gradient range search according to a specific embodiment of the present disclosure.

Taking FIG. 3 as an example, an amphibious map with coastline information shown in FIG. 3 is constructed. The coastline includes a feasible land-water transition region. A landing scenario with a starting point on water and a target point on land is taken as an example to simulate a cross-domain path planning task.

The starting point is connected to the target point, and an intersection X of a line connecting the two points and the coastline is determined as an intermediate node.

Extension from the intermediate node X toward two ends is performed to obtain a three-level search range shown in FIG. 3.

The numbers of iterations of the first-level range to the third-level range are determined as $n_1$, $n_2$, $n_3$ respectively based on a size of a feasible land-water transition region included in each range.

A locally-optimal land-water transition point of each range is obtained by searching in a level-wise search mode in the foregoing three-level search range, which is specifically described as follows:

the level-wise search mode means searching backward from the first level in the foregoing three-level search range until the number of iterations of the current search range is reached, and then proceeding is performed to the next level of search range. It is assumed that in a search range, there is an amphibious map environment (numbers on the map are passability cost values of grids, a smaller number indicates that it is easier to pass the grid, and co represents an impassable region) which is similar to that shown FIG. 4, that is, the range includes three feasible land-water transition regions. On this basis, two landing points A and B shown in the figure are obtained by random sampling. It can be seen from FIG. 4 that when only the land-water transition cost is considered, the point A is the current locally-optimal land-water transition point. However, lengths and safety of water and land paths determined by the transition point B are superior to those by the point A to some extent. It can be concluded that when a land-water transition point is selected, a cost $h_{transition}$ of the land-water transition point, and a water cost $h_{water}$ and a land cost $h_{land}$ determined by the transition point, i.e., a total cost $f=h_{water}+h_{land}+h_{transition}$, should all be considered. (In this example, $h_{water}$ and $h_{land}$ are length values of a water path and a land path respectively, and $h_{transition}$ represents a cost of terrain passability near the land at this point.)

In conclusion, a land-water transition point with a minimum total cost f should be selected within the set number of iterations as the locally-optimal land-water transition point in the current search range, and is added to a constructed candidate set of land-water transition points.

After the current locally-optimal land-water transition point is added to the candidate set of land-water transition points, a heuristic cost value G of the current range determined by the locally-optimal land-water transition point is calculated, and then whether to continue range traversal is determined based on a size relationship between the value G and the value f. If $f<a \cdot G$ the traversal (where a=1.2-1.5) is terminated, that is, it is determined that there is no locally-optimal land-water transition point in the subsequent search range that has a total cost less than that of the current locally-optimal land-water transition point, otherwise, the range traversal is continued, and locally-optimal land-water transition points in all ranges are found and added to the candidate set of land-water transition points.

Figure 4:
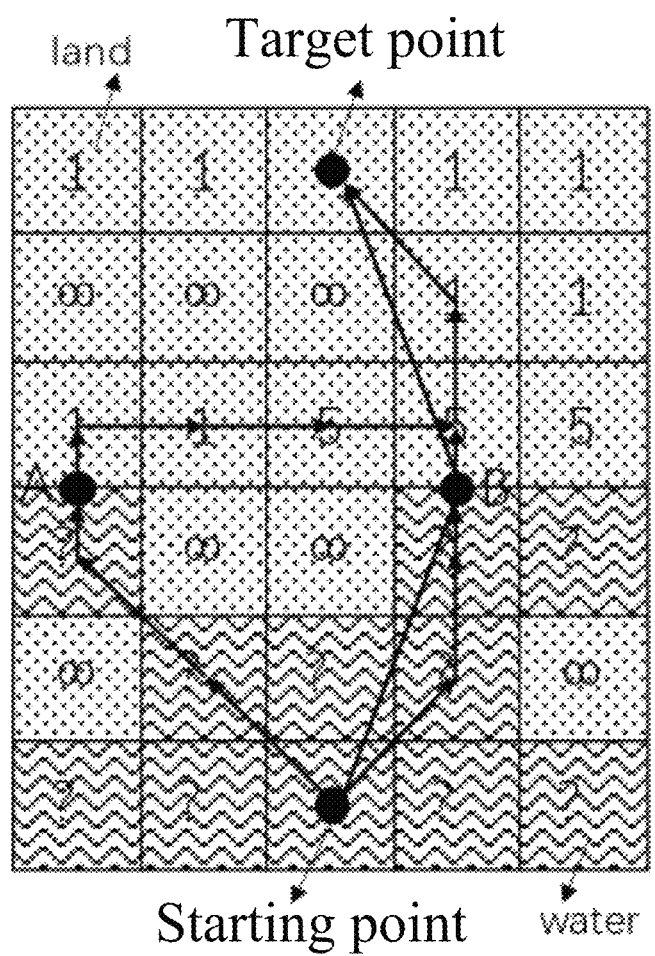
FIG. 4 is a schematic diagram of landing point cost analysis according to a specific embodiment of the present disclosure.

The determining of the heuristic cost value G is shown in FIG. 4, and the point B is determined as the locally-optimal land-water transition point in the current search range. When all impassable regions on the map are ignored, the starting point, the locally-optimal land-water transition point B of the current range, and the target point are connected, and the value G is determined to be equal to the sum of the length of a straight-line path formed by the three points and the cost of the current locally-optimal land-water transition point.

A globally-optimal land-water transition point is selected from the candidate set of land-water transition points based on a minimum total cost f, then the starting point and the target point of the cross-domain path planning task are redefined, and the cross-domain path planning task is divided into a land planning stage and a water planning stage. Starting points of the two stages are the globally-optimal land-water transition point, and target points thereof are separately the starting point or the target point of the cross-domain path planning task, then path searching is performed based on a corresponding global path planning algorithm of each stage, and finally paths are merged, that is, a found water path and land path are merged into a final path of the cross-domain path planning task.

In the present disclosure, the cross-domain path planning task is divided into the water planning stage and the land planning stage based on the idea of task splitting, so that the problem of difficulty in cross-domain path planning caused by the mismatch of formats of land and water maps is solved, the timeliness during land-water transition operations of unmanned amphibious vehicles is effectively ensured, and economic problems such as vehicle wear and energy consumption caused by relatively poor path quality are also solved.

Each embodiment in this specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple. For the related part, reference may be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A method for decomposing cross-domain path planning of an amphibious vehicle, comprising:
    acquiring an amphibious map containing coastline information, determining a starting point and a target point of a cross-domain path planning task of the amphibious vehicle based on the amphibious map, and constructing a candidate set of land-water transition points, wherein the coastline information comprises several pieces of feasible land-water transition region position information;
    setting a multilevel gradient search range on a coastline, and setting a set number of iterations for each search range;
    searching from each search range based on the set number of iterations in a level-wise search mode, determining a locally-optimal land-water transition point in each search range, and adding the locally-optimal land-water transition point into the candidate set of land-water transition points;
    setting a heuristic search termination condition, and determining, based on the heuristic search termination condition, whether there is a possibility that a current locally-optimal land-water transition point is globally optimal;
    if yes, stopping searching, and selecting a globally-optimal land-water transition point from the candidate set of land-water transition points; or
    if no, determining whether the multilevel gradient search range is completely traversed;
    if yes, stopping searching, and selecting a globally-optimal land-water transition point from the candidate set of land-water transition points; or
    if no, continuing to traverse the multilevel gradient search range until the globally-optimal land-water transition point is determined; and
    redetermining the starting point and the target point of the cross-domain path planning task based on the globally-optimal land-water transition point, and performing global path planning.

2. The method for decomposing cross-domain path planning of an amphibious vehicle according to claim 1, wherein the starting point and the target point are located in different geographical regions; and the geographical regions comprise land and water areas.

3. The method for decomposing cross-domain path planning of an amphibious vehicle according to claim 1, wherein the setting a multilevel gradient search range on a coastline, and setting a set number of iterations for each search range specifically comprises:
    selecting an intersection of a line connecting the starting point to the target point and the coastline as an intermediate node;
    extending leftward and rightward for a set distance along the coastline with the intermediate node as a center, determining a left first-level node and a right first-level node, and taking a range formed by the left first-level node and the right first-level node on the coastline as a first-level search range;
    continuing to extend leftward from the left first-level node and extend rightward from the right first-level node to obtain a left second-level node and a right second-level node, and taking a range formed by the left first-level node and the left second-level node on the coastline and a range formed by the right first-level node and the right second-level node on the coastline as a two-level search range;
    continuing to determine the search range until the entire coastline between the starting point and the target point is traversed, to complete setting of the multilevel gradient search range, wherein when the search range is determined, if a coastline end point is reached in advance during extension in one of the leftward direction and the rightward direction, range length compensation is performed in the opposite direction to ensure that a length of each level of search range is kept the same; when the next level of search range is determined, unidirectional extension is performed in a direction opposite to the original extension direction, and an extended distance is twice an extended distance in the original extension direction when the previous level of search range is determined; and allocating, after the multilevel gradient search range is obtained, the number of range iterations based on a size of a feasible land-water transition region comprised in each range.

4. The method for decomposing cross-domain path planning of an amphibious vehicle according to claim 1, wherein the determining a locally-optimal land-water transition point in each search range specifically comprises:

randomly sampling in a feasible land-water transition region comprised in a current search range, and determining a total cost value of a current land-water transition point by using formula $f=h_{water}+h_{land}+h_{transition}$ for land-water transition points obtained by sampling, wherein f is the total cost value of the current land-water transition point, $h_{water}$ is a cost value of reaching a starting point or a target point on water from the current land-water transition point, $h_{land}$ is a cost value of reaching a starting point or a target point on land from the current land-water transition point, and $h_{transition}$ is a cost value of the current land-water transition point; and selecting, within a range of the set number of iterations, a land-water transition point with a minimum total cost value as the locally-optimal land-water transition point in the current search range.

5. The method for decomposing cross-domain path planning of an amphibious vehicle according to claim 4, wherein the setting a heuristic search termination condition, and determining, based on the heuristic search termination condition, whether there is a possibility that a current locally-optimal land-water transition point is globally optimal specifically comprises:

determining a heuristic cost value of the current search range based on a positional relationship between the starting point, the target point, and the locally-optimal land-water transition point in the current search range, wherein the heuristic cost value represents a minimum path length from the starting point to the target point through the optimal land-water transition point without considering any obstacles;

determining whether the total cost value of the locally-optimal land-water transition point in the current search range and the heuristic cost value of the current search range meet a condition $f \leq a \cdot G$ wherein a is an optimality proportional coefficient, and G is the heuristic cost value; and determining, if the condition is met, that there is no locally-optimal land-water transition point in the subsequent search range that has a total cost value less than that of the current locally-optimal land-water transition point, and terminating the searching.

6. The method for decomposing cross-domain path planning of an amphibious vehicle according to claim 1, wherein the redetermining the starting point and the target point of the cross-domain path planning task based on the globally-optimal land-water transition point, and performing global path planning specifically comprises:

dividing the cross-domain path planning task into a land planning stage and a water planning stage based on the globally-optimal land-water transition point, wherein starting points of the land planning stage and the water planning stage are the globally-optimal land-water transition point, and target points of the land planning stage and the water planning stage are separately the starting point or the target point of the cross-domain path planning task; and performing path search based on a global path planning algorithm corresponding to the land planning stage and the water planning stage, and merging a found water path and land path into a final path of the cross-domain path planning task to complete the global path planning.

7. A system for decomposing cross-domain path planning of an amphibious vehicle, comprising:

a unit for defining a starting point and a target point and constructing a candidate set of land-water transition points configured to acquire an amphibious map containing coastline information, determine a starting point and a target point of a cross-domain path planning task of an amphibious vehicle based on the amphibious map, and construct a candidate set of land-water transition points, wherein the coastline information comprises several pieces of feasible land-water transition region position information;

a search range determining unit configured to set a multilevel gradient search range on a coastline, and set a set number of iterations for each search range;

a unit for determining a locally-optimal land-water transition point configured to search from each search range based on the set number of iterations in a level-wise search mode, determine a locally-optimal land-water transition point in each search range, and add the locally-optimal land-water transition point into the candidate set of land-water transition points;

a unit for determining a globally-optimal land-water transition point configured to set a heuristic search termination condition, and determine, based on the heuristic search termination condition, whether there is a possibility that a current locally-optimal land-water transition point is globally optimal;

further configured to stop searching when there is a possibility that a current locally-optimal land-water transition point is globally optimal, and select a globally-optimal land-water transition point from the candidate set of land-water transition points;

further configured to determine, when there is no possibility that a current locally-optimal land-water transition point is globally optimal, whether the multilevel gradient search range is completely traversed;

further configured to stop searching when the multilevel gradient search range is completely traversed, and select a globally-optimal land-water transition point from the candidate set of land-water transition points; and further configured to continue to traverse, when the multilevel gradient search range is not completely traversed, the multilevel gradient search range until the globally-optimal land-water transition point is determined; and a global path planning unit configured to redetermine the starting point and the target point of the cross-domain path planning task based on the globally-optimal land-water transition point, and perform global path planning.

8. The system for decomposing cross-domain path planning of an amphibious vehicle according to claim 7, wherein the search range determining unit specifically comprises:

an intermediate node determining module configured to select an intersection of a line connecting the starting point to the target point and the coastline as an intermediate node;

a search range determining module configured to extend leftward and rightward for a set distance along the coastline with the intermediate node as a center, determine a left first-level node and a right first-level node, and take a range formed by the left first-level node and the right first-level node on the coastline as a first-level search range;

further configured to continue to extend leftward from the left first-level node and extend rightward from the right first-level node to obtain a left second-level node and a right second-level node, and take a range formed by the left first-level node and the left second-level node on the coastline and a range formed by the right first-level node and the right second-level node on the coastline as a two-level search range; and further configured to continue to determine the search range until the entire coastline between the starting point and the target point is traversed, to complete setting of the multilevel gradient search range; and a module for allocating a number of iterations configured to allocate, after the multilevel gradient search range is obtained, the number of range iterations based on a size of a feasible land-water transition region comprised in each range.

9. The system for decomposing cross-domain path planning of an amphibious vehicle according to claim 7, wherein the unit for determining a locally-optimal land-water transition point specifically comprises:

a module for determining a total cost value of a current land-water transition point configured to randomly sample in a feasible land-water transition region comprised in a current search range, and determine a total cost value of a current land-water transition point by using formula $f=h_{water}+h_{land}+h_{transition}$ for land-water transition points obtained by sampling, wherein f is the total cost value of the current land-water transition point, $h_{water}$ is a cost value of reaching a starting point or a target point on water from the current land-water transition point, $h_{land}$ is a cost value of reaching a starting point or a target point on land from the current land-water transition point, and $h_{transition}$ is a cost value of the current land-water transition point; and a module for determining a locally-optimal land-water transition point configured to select, within a range of the set number of iterations, a land-water transition point with a minimum total cost value as the locally-optimal land-water transition point in the current search range.

10. The system for decomposing cross-domain path planning of an amphibious vehicle according to claim 9, wherein the unit for determining a globally-optimal land-water transition point specifically comprises:

a unit for calculating a heuristic cost value configured to determine a heuristic cost value of the current search range based on a positional relationship between the starting point, the target point, and the locally-optimal land-water transition point in the current search range, wherein the heuristic cost value represents a minimum path length from the starting point to the target point through the optimal land-water transition point without considering any obstacles; and a determining unit configured to determine whether the total cost value of the locally-optimal land-water transition point in the current search range and the heuristic cost value of the current search range meet a condition f<a·G, wherein a is an optimality proportional coefficient, and G is the heuristic cost value; and further configured to determine, when the condition f<a·G is met, that there is no locally-optimal land-water transition point in the subsequent search range that has a total cost value less than that of the current locally-optimal land-water transition point, and terminate the searching.

* * * * *